United States Patent [19]

Johnson

[11] Patent Number: 5,687,942

[45] Date of Patent: *Nov. 18, 1997

[54] SUPPORT SYSTEM

[76] Inventor: Ruben R. Johnson, 3609 W. Castile Ct., Peoria, Ill. 61615

[*] Notice: The term of this patent shall not extend beyond the expiration date of Pat. No. 5,433,416.

[21] Appl. No.: 459,712

[22] Filed: Jun. 2, 1995

[51] Int. Cl.⁶ .................................................. F16B 3/00
[52] U.S. Cl. ........................... 248/223.41; 248/225.11; 5/503.1; 280/250.1; 280/304.1
[58] Field of Search ..................... 248/475.1, 223.1, 248/223.41, 224.7, 224.8, 314, 489, 477, 496, 224.61, 225.11, 125.8, 125.9; 403/381, 383; 280/304.1, 250.1; 5/503.1, 658

[56] References Cited

U.S. PATENT DOCUMENTS

| 5,135,191 | 8/1992 | Schmuhl | 280/304.1 X |
| 5,340,069 | 8/1994 | Niemeyer | 248/214 |
| 5,386,961 | 2/1995 | Lu | 248/223.41 |
| 5,421,548 | 6/1995 | Bennett et al. | 5/503.1 X |
| 5,433,416 | 7/1995 | Johnson | 248/475.1 |

FOREIGN PATENT DOCUMENTS

| 662762 | 4/1964 | Italy | 248/224.61 |
| 2229487 | 9/1990 | United Kingdom | 403/381 |

Primary Examiner—Timothy B. Kang
Attorney, Agent, or Firm—John R. Hoffman

[57] ABSTRACT

A support system is provided for detachably mounting an article to a tubular support structure. The system includes a bracket plate having a key-way with side walls diverging from a front face of the bracket plate to a rear face thereof. The key-way extends entirely through the bracket plate between the front and rear faces and includes an entry mouth opening at an edge of the bracket plate. A support plate is adapted to be attached to the rear face of the bracket plate to close the key-way at the rear face. A mounting device mounts the bracket plate and attached support plate to one of the tubular members, with the key-way facing away from and extending longitudinally of the one tubular member. An elongated supporting key is adapted to be attached to the other of the tubular members lengthwise thereof. The supporting key is positionable into the entry mouth of the key-way and has side walls converging from a front face of the key to a rear face thereof for mating proximity to the diverging side walls of the key-way.

19 Claims, 5 Drawing Sheets

FIG. 6
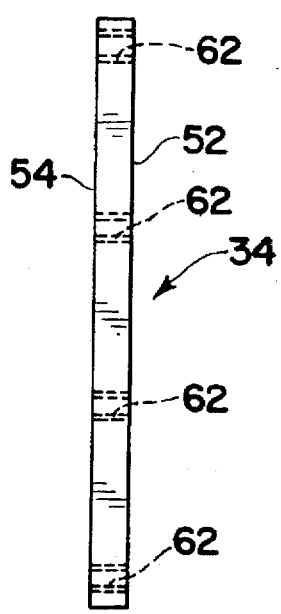
FIG. 5
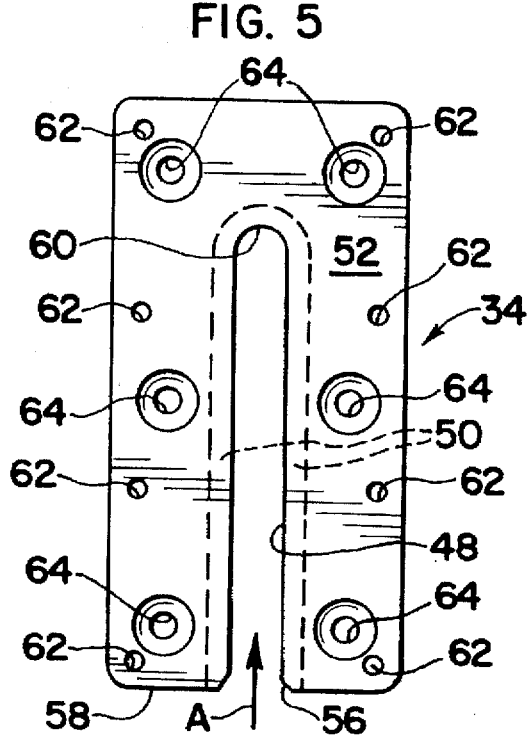
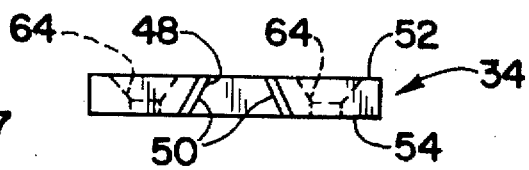
FIG. 7
FIG. 8
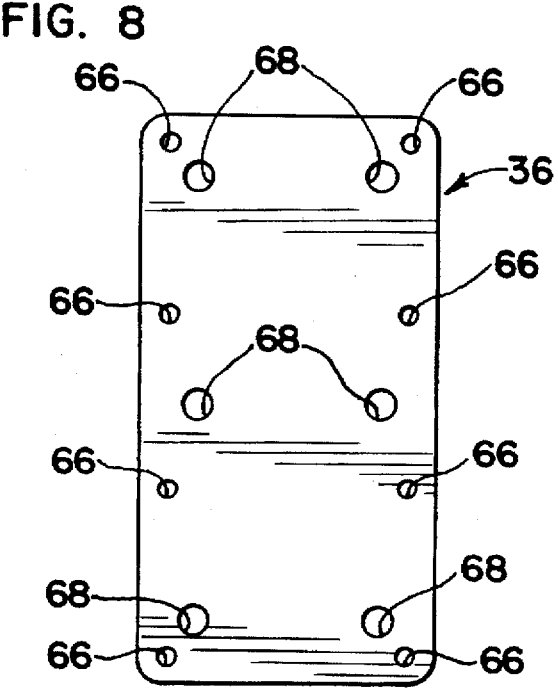
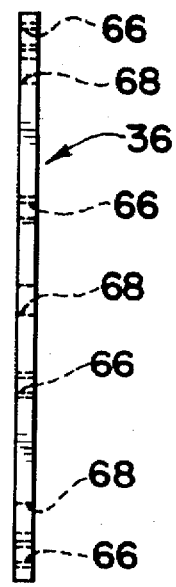
FIG. 9

FIG. 17
FIG. 18
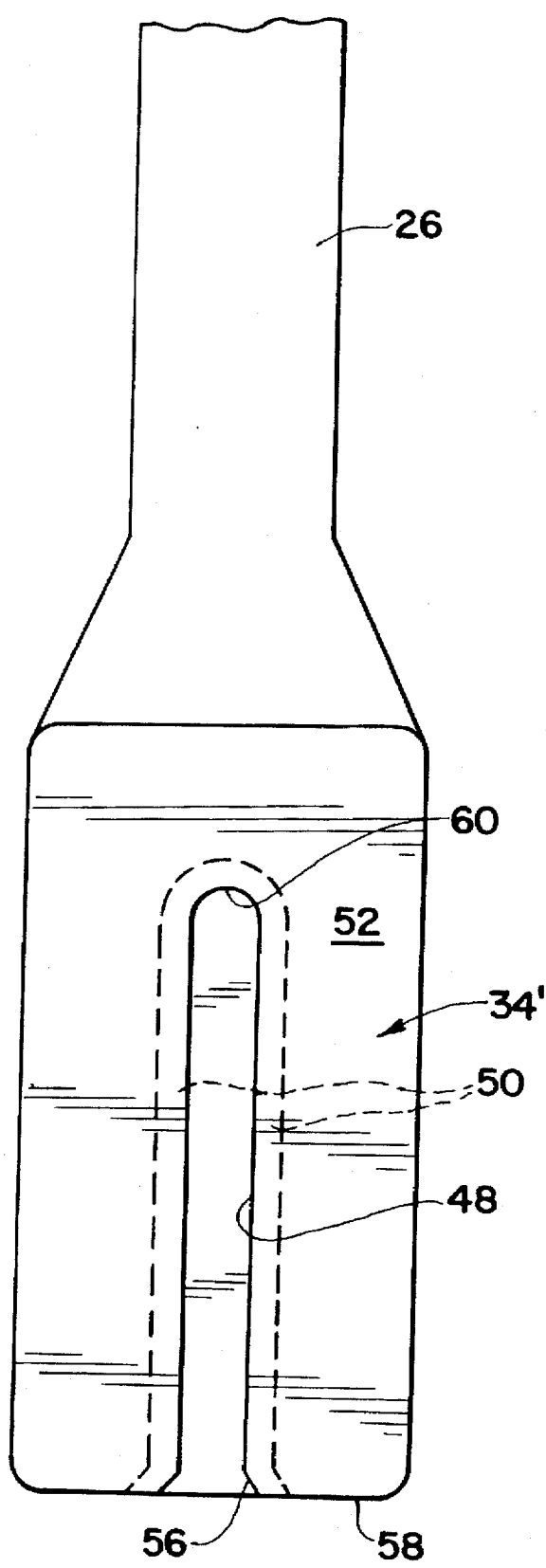
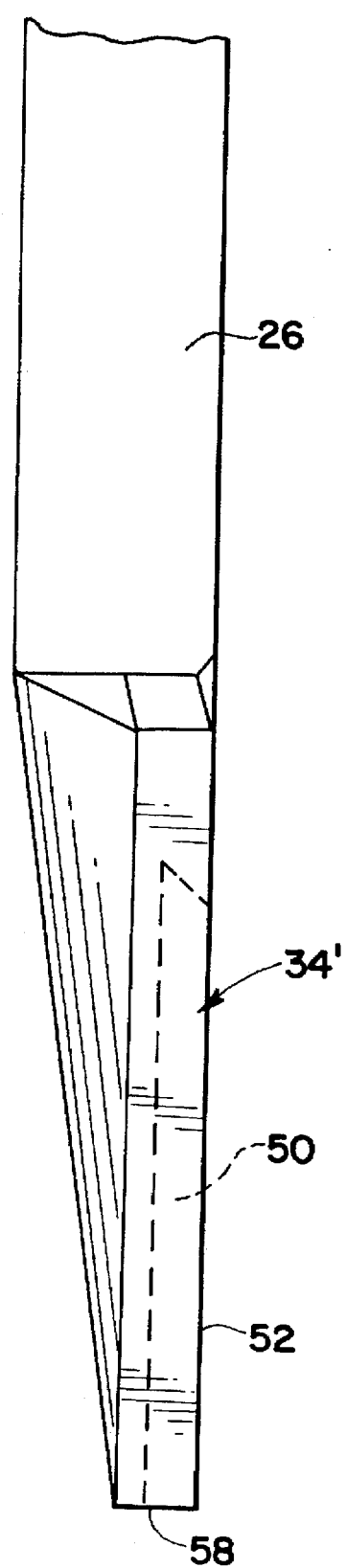

5,687,942

SUPPORT SYSTEM

RELATED APPLICATION

My co-pending application Ser. No. 08/179,158, filed Jan. 10, 1994, now U.S. Pat. No. 5,433,416, filed Jan. 10, 1994, to an "Article Support System" which is incorporated herein by reference.

FIELD OF THE INVENTION

This invention generally relates to the art of brackets, clips and the like for mounting articles to supporting surfaces or structures and for supporting articles in general and, particularly, to a support system for detachably mounting tubular articles on tubular support structures.

Background of the Invention

There have been a wide variety of mounting brackets, retainer clips, fastening devices and the like for fastening two bodies together, such as removably or detachably mounting an article to a support structure, such as a wall or other support surface. Examples of some such devices are shown in U.S. Pat. Nos. 2,732,159 to Connors et al, dated Jan. 24, 1956; 2,887,233 to Bybee, dated May 19, 1959; 3,840,261 to Fulkerson et al, dated Oct. 8, 1974; 3,878,589 to Schaefer, dated Apr. 22, 1975; 5,026,016 to Lisowski, dated Jun. 25, 1991; and Des. 329,192 to Susac, dated Sep. 9, 1992, as well as Canadian Patent No. 626,684, dated Sep. 5, 1961; British Patent Specifications 753,778, published Aug. 1, 1956, and 1,077,792, published Aug. 7, 1967; and French Patent Publications 1.317.285 (1963) and 2.422.369 (1979).

All of the items of prior art listed above show one form or another of a mounting system which includes some form of a bracket for mounting on a support structure, the bracket having a key-way for receiving a supporting key or keyed clip for detachably mounting an article on the support structure. Most often the key-ways/keys are wedge shaped which can cause binding between the bracket and the clip. Invariably, all of the brackets in this body of prior art have key-ways which are closed. In other words, the key-ways are closed by walls of the brackets. Such structures create limitations on the uses of the support systems. Closed key-ways, for instance, have a tendency to cause binding and even a "lock-up" condition between the two interengaged bodies. This is particularly problematic with heavy bodies or objects.

In my U.S. Pat. No. 5,433,416, a novel article support system is shown to include two basic components, namely a bracket plate having a key-way therein which is open through opposite faces of the bracket, and a supporting key for detachable insertion into the key-way. The bracket plate is adapted to be attached to either an article or a support structure and, similarly, the supporting key is adapted to be attached to the opposite of the article or support structure. With the key-ways in the bracket plates being completely open, potential binding is substantially eliminated, and the bracket plates, as well as the supporting keys, can be stacked or reversed in a variety of orientations depending upon the use of the support system. The key-ways/keys preferably have straight sides to further eliminate potential binding.

The present invention is directed to improvements in my article support system to adapt the system for detachably mounting an article on a tubular support structure or to mount a tubular article on a tubular support structure.

SUMMARY OF THE INVENTION

An object, therefore, of the invention is to provide a new and improved support system for detachably mounting tubular articles to tubular support structures.

In the exemplary embodiment of the invention, generally, a support system is disclosed for detachably mounting an article on a tubular support structure. The system includes a bracket plate having key-way with side walls diverging from a front face of the bracket plate to a rear face thereof. The key-way extends entirely through the bracket plate between its faces and includes an entry mouth opening at an edge of the bracket plate. A support plate is adapted to be attached to the rear face of the bracket plate to close the key-way at the rear face of the bracket plate. Mounting means are provided for mounting the bracket plate and the attached support plate to the tubular support structure, with the key-way facing away from the tubular support structure. A supporting key is adapted to be attached to the article and is positionable through the entry mouth of the key-way. The key has side walls converging from a front face of the key to a rear face thereof for mating proximity to the diverging side walls of the key-way.

As disclosed herein, the attachment means is provided by at least one U-bolt type member having an arcuate portion joining a pair of leg portions. The arcuate portion is adapted to surround the tubular support structure. The leg portion is adapted for attachment to the bracket plate and the attached support plate.

More specifically, the support system of the invention is designed for detachably securing a pair of tubular members. Therefore, the key-way is elongated such that, when the bracket plate is attached to one of the tubular members, the key-way extends longitudinally thereof. The supporting key is elongated and adapted to be attached to the other of the tubular support members lengthwise thereof.

Still further, the invention contemplates utilizing the aforementioned system for detachably securing an intravenous (IV) stand to a wheelchair. Specifically, the wheelchair has a tubular frame portion, and the IV stand has a tubular support post. The bracket plate and supporting key of the invention are readily applicable for detachably securing these tubular portions of the IV stand and the wheelchair.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 5 is a front elevational view of the bracket plate of the support system;

FIG. 6 is a side elevational view of the bracket plate, looking toward the left-hand side of FIG. 5;

FIG. 7 is a bottom plan view of the bracket plate of FIG. 5;

FIG. 8 is a front elevational view of the support plate of the support system;

3

Figure 16:
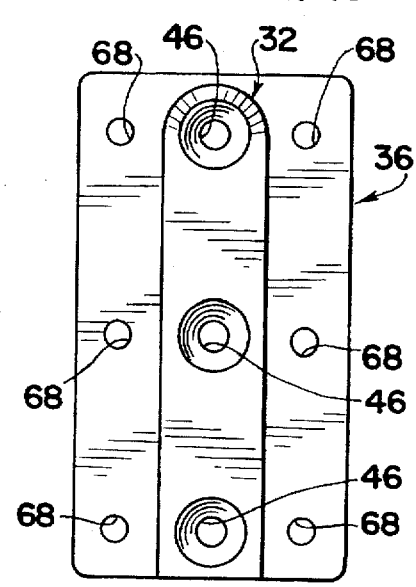
Figure 10:
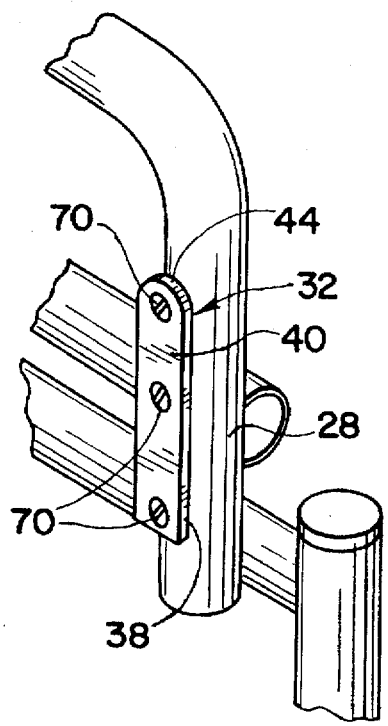
Figure 12:
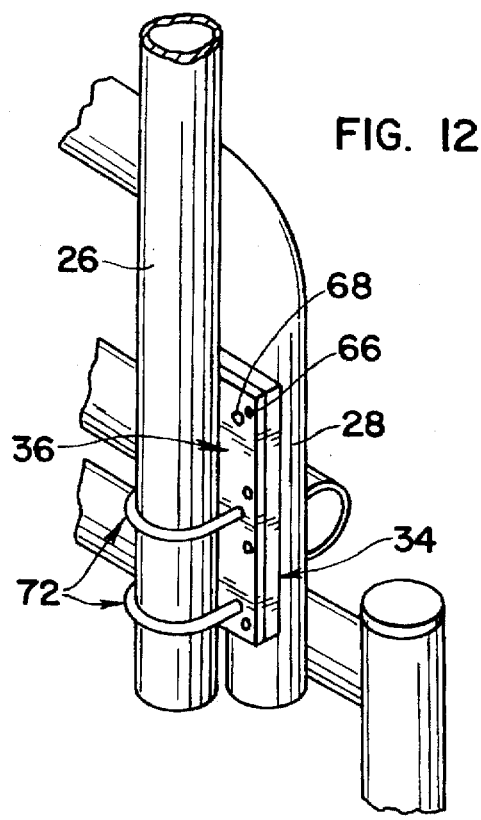
Figure 11:
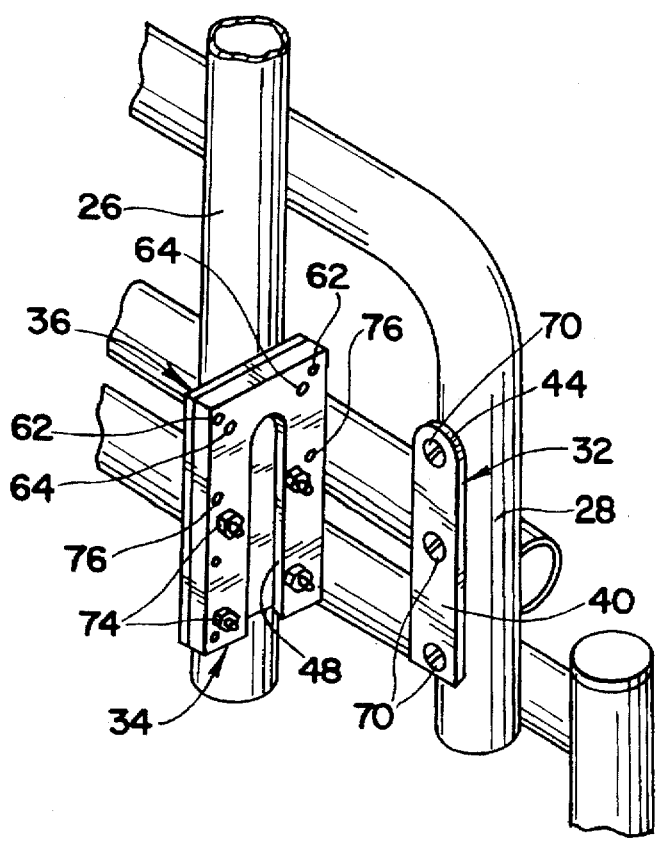
Figure 13:
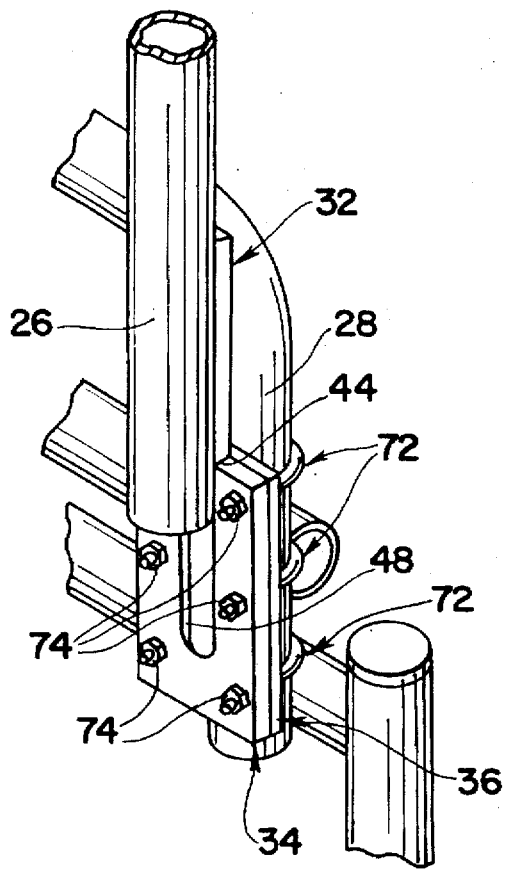
Figure 14:
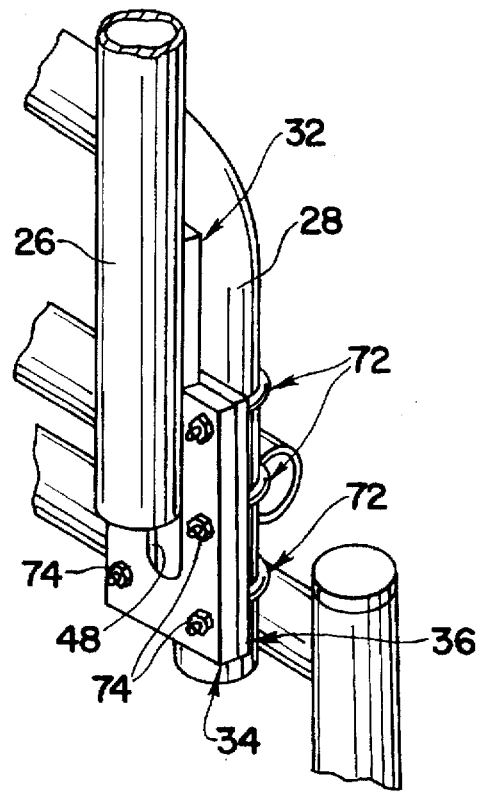
Figure 15:
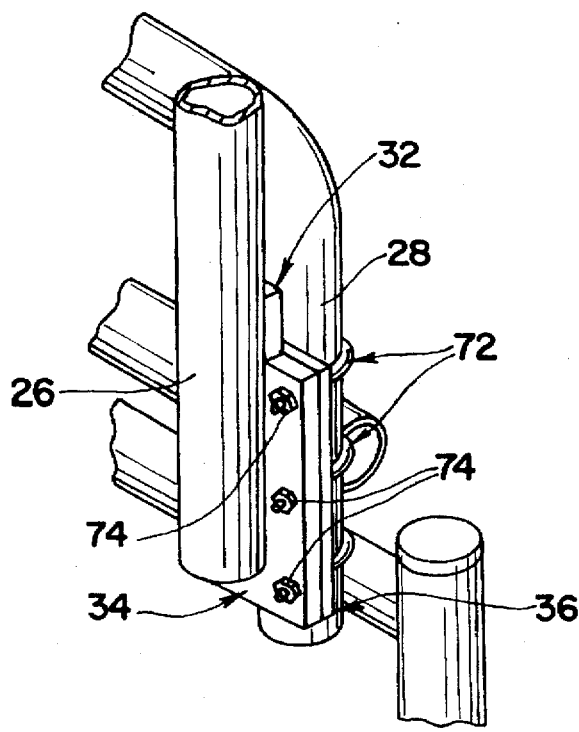

FIG. 9 is a side elevational view of the support plate, looking toward the right-hand side of FIG. 8;

FIG. 10 is a perspective view of the supporting key attached to a tubular frame portion of the wheelchair;

FIG. 11 is a view similar to that of FIG. 10, but also showing the bracket plate and attached support plate secured to a tubular support post of the IV stand;

FIG. 12 is a view similar to that of FIG. 11, with the tubular support post of the IV stand detachably secured to the tubular frame portion of the wheelchair by the support system of the invention;

FIG. 13 is a view similar to FIGS. 10–12, but showing a reversal of the components wherein the supporting key is attached to the tubular support post of the IV stand and the bracket plate and support plate are attached to the tubular frame portion of the wheelchair;

FIG. 14 is a view similar to that of FIG. 13, with the supporting key initially being inserted into the key-way of the bracket plate;

FIG. 15 is a view similar to that of FIG. 14, with the support system fully engaged or secured;

FIG. 16 is a front elevational view of the supporting key secured to the support plate of the support system;

FIG. 17 is a front elevational view of an alternate form of the invention wherein the bracket plate is integral with the bottom of the tubular support post of the IV stand; and FIG. 18 is a side elevational view looking toward the left-hand side of FIG. 17.

DETAILED DESCRIPTION OF THE PREFERRED EMBODIMENTS

Figure 1:
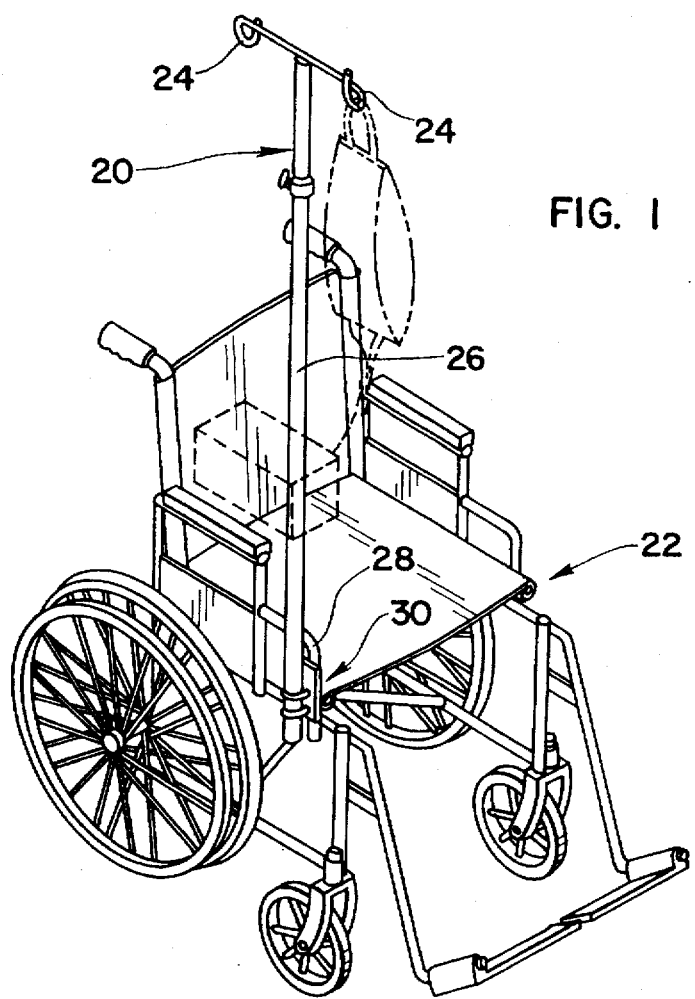
FIG. 1 is a perspective view of a wheelchair having an IV stand detachably secured thereto by the support system of the invention.

Referring to the drawings in greater detail, and first to FIG. 1, the support system of the invention generally is adapted for detachably mounting an article on a tubular support structure or for securing a pair of tubular members. In the preferred embodiment of the invention, the support system is illustrated in FIG. 1 for detachably securing an IV stand, generally designated 20, to a wheelchair, generally designated 22. The IV stand has means such as hooks or loops 24 at the top thereof for hanging bags of intravenous fluids. The bags are not shown, and an IV pump/meter (also not shown) typically is mounted somewhere along a tubular support post 26 of the stand. Wheelchair 22 is of a conventional construction and will not be described in detail. Suffice it to say, the wheelchair typically is fabricated of a configuration of tubular components including a vertical tubular frame portion 28. The present invention is embodied in a support system, generally designated 30, for detachably securing tubular support post 26 of IV stand 20 to tubular frame portion 28 of wheelchair 22.

More particularly, support system 30 of the present invention includes four basic components, namely, a supporting key, generally designated 32 and shown in FIGS. 2–4; a bracket plate, generally designated 34 and shown in FIGS. 5–7; a support plate, generally designated 36 and shown in FIGS. 8 and 9; and mounting means (described hereinafter) for mounting the bracket plate and support plate to one of the tubular members.

Figure 2:
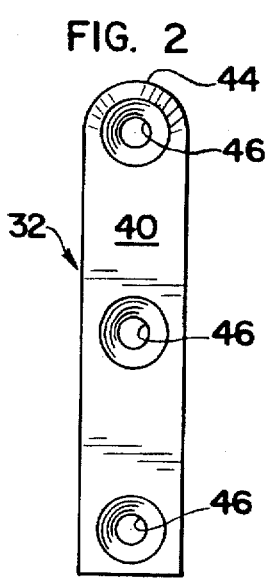
FIG. 2 is a front elevational view of the supporting key of the support system of the invention.
Figure 3:
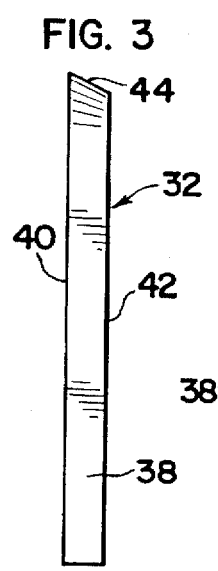
FIG. 3 is a side elevational of the supporting key, looking toward the left-hand side of FIG. 2.
Figure 4:
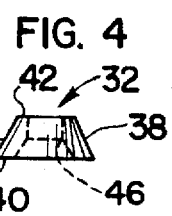
FIG. 4 is a top plan view of the supporting key of FIG. 2.

Referring to FIGS. 2–4, supporting key 32 is an elongated structure and has generally parallel side walls 38 converging from a front face 40 of the key to a rear face 42 thereof. The key also has an angled end wall 44 generally at the same converging angle as side walls 38. Three countersunk/chamfered apertures 46 extend through supporting key 32 for attaching the key to a tubular support member or structure lengthwise of the structure by means of screws or bolts.

4

Referring to FIGS. 5–7, bracket plate 34 includes a key-way 48 having parallel side walls 50 diverging from a front face 52 of the bracket plate to a rear face 54 thereof. The key-way extends entirely through the bracket plate between the front and rear faces and includes an entry mouth 56 opening at an edge 58 of the bracket plate. Key-way 48 has a closed end 60 opposite entry mouth 56. Therefore, end 44 (FIGS. 2 and 3) of supporting key 32 is insertable into entry mouth 56 of key-way 48 in the direction of arrow "A" (FIG. 5) until the end of the supporting key reaches closed end 60 of the key-way.

Bracket plate 34 also includes a plurality of through apertures 62 for receiving fastening means (not shown) to attach the bracket plate to support plate 36 (FIGS. 8 and 9) as described hereinafter. Lastly, bracket plate 34 also includes a plurality of through apertures 64 for receiving the mounting means (described hereinafter) which mount the bracket plate and support plate to a tubular support member.

Referring to FIGS. 8 and 9, supporting plate 36 simply is a generally flat plate having peripheral dimensions substantially identical to the peripheral dimensions of bracket plate 34. The support plate is adapted to be attached to rear face 54 of bracket plate 34 to close key-way 48 at the rear of the bracket plate. Therefore, when supporting key 32 is inserted into the key-way, the supporting key will be captured therewithin and sandwiched between the diverging side walls 50 of the bracket plate and the flat face of support plate 36.

Support plate 36 has a plurality of apertures 66 which align with apertures 62 in bracket plate 34 when the two plates are juxtaposed. Fastening means such as screws or bolts are used to attach the plates together with the support plate closing key-way 48 at the rear face 54 of the bracket plate. Supporting key 32, bracket plate 34 and support plate 36 all can be conveniently fabricated of metal material, and metal screws can be used for securing the plates together. Lastly, support plate 36 includes a plurality of through apertures 68 which are in alignment with apertures 64 in bracket plate 34 when the plates are juxtaposed, for receiving mounting means (described hereinafter) for mounting the bracket plate and the attached support plate to a second tubular support structure.

Referring to FIG. 10, supporting key 32 is shown secured by fastening screws or bolts 70 to tubular frame portion 28 of wheelchair 22. It can be seen that the elongated key-way runs lengthwise of the tubular frame portion. It also can be seen that the front face 40 (FIGS. 2–4) of the supporting key faces outwardly away from the tubular frame portion, whereby the side walls 38 of the supporting key converge rearwardly toward the tubular frame portion.

FIGS. 11 and 12 show the assembly of bracket plate 34 and support plate 36 secured by a pair of U-bolt type members 72 to tubular support post 26 of the IV stand. As is known, U-bolts include an arcuate portion joining a pair of leg portions. Therefore, it can be seen in FIG. 12 that the arcuate portions of U-bolts 72 surround tubular support post 26, and the leg portions of the U-bolts project through apertures 68 in support plate 36 and apertures 64 (FIG. 11) in bracket plate 34. A third U-bolt normally could be used but is removed from FIGS. 11 and 12 to enable an illustration of apertures 64 and 68. The distal ends of the leg portions of the U-bolts are threaded for threadingly receiving nuts 74 (FIG. 11) to tightly secure the bracket plate/support plate assembly to the tubular support post. Lastly, fastening bolts or screws 76 are used for attaching bracket plate 34 and support plate 36 together through apertures 62

(FIGS. 6 and 7) of the bracket plate and apertures 66 (FIGS. 8 and 9) of the support plate.

FIGS. 13–15 simply show that supporting key 32 and the assembly of bracket plate 34 and support plate 36 can be reversed in their respective dispositions on the IV stand and the wheelchair. In other words, it can be seen that the supporting key is attached to tubular support post 26 of the IV stand, and the assembly of bracket plate 34 and support plate 36 is attached to tubular frame portion 28 of the wheelchair by U-bolts 72. The function and operation of the support system is identical to that described above and shown in FIGS. 10–12, except it should be noted that the vertical orientation of the supporting key and the bracket plate/support plate assembly are inverted. In other words, since the IV stand is moved into detachable securement with the wheelchair, the bracket plate/support plate assembly is fixed to the wheelchair with the entry mouth 56 (FIG. 5) of key-way 48 facing upwardly. End 44 (FIG. 13) of supporting key 32 faces downwardly for vertical insertion into the key-way. Otherwise, the operation and function of the support system is identical to that described above. FIG. 14 shows the support system in partial engagement, and FIG. 15 shows the support system in full engagement and securement of the IV stand to the wheelchair.

FIG. 16 shows the support system of the invention wherein one of the supporting keys 32 is secured to one of the support plates 36, the support plate again including through apertures 68 for receiving U-bolts to tightly secure the supporting key/support plate assembly to a tubular support post. The supporting key is shown with the countersunk/chamfered apertures 46 described above in relation to FIGS. 2–4. However, these apertures are not always needed when using the supporting key in conjunction with the support plate. On the other hand, providing supporting keys without the apertures would unnecessarily increase inventory costs. The structure of FIG. 16 can be fabricated as a one-piece or integral structure.

FIGS. 17 and 18 show an embodiment wherein a bracket plate, generally designated 34' is formed integral with the bottom distal end of a tubular support structure, such as tubular support post 26 of the IV stand. Again, the bracket plate has a key-way 48 with parallel side walls 50 diverging from a front face 52. The key-way again has a closed end 60 opposite an entry mouth 56 at an edge 58 forming the bottom of the post. This integral structure can be used to attach the post directly to the supporting key, such as is shown in FIG. 10 and described above. Still further, rather than the bracket plate being integral with the bottom of support post 26 as shown in FIGS. 17 and 18, the bracket plate could be otherwise secured to the support post by such means as a telescoping interface, rather than the U-bolts described above.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. A support system for detachably mounting an article on a support structure, comprising:

a bracket plate including a key-way having side walls diverging from a front face of the bracket plate to a rear face thereof, the key-way extending entirely through the bracket plate between said face and including an entry mouth opening at an edge of the bracket plate;

a supporting key adapted to be attached to said article, the supporting key being positionable through the entry mouth of said key-way and having side walls converging from a front face of the key to a rear face thereof for mating proximity to the diverging side walls of the key-way; and a support plate attached to one of the bracket plate and the supporting key at the rear face thereof.

2. The support system of claim 1 wherein the diverging side walls of the key-way are generally parallel to the converging side walls of the supporting key and said key-way includes a closed end opposite the entry mouth thereof.

3. The support system of claim 1 wherein the support plate and bracket plate are integral.

4. The support system of claim 1, wherein the support plate and supporting key are integral.

5. The support system of claim 1 wherein said bracket plate includes aperture means for facilitating fastening of the bracket plate to the support plate.

6. The support system of claim 1 wherein said supporting key has aperture means for facilitating fastening of the supporting key to said article.

7. The support system of claim 1 wherein the system is arranged for detachably mounting the article on a tubular support structure, and including mounting means for mounting the bracket plate to the tubular support structure.

8. The support system of claim 7 wherein said mounting means comprises at least one U-bolt type member having an arcuate portion joining a pair of leg portions, the arcuate portion being adapted to surround the tubular support structure, and the leg portions being adapted for attachment to the bracket plate.

9. A support system for detachably securing a pair of tubular members, comprising:

a bracket plate including an elongated key-way having side walls diverging from a front face of the bracket plate to a rear face thereof, the key-way extending entirely through the bracket plate between said faces and including an entry mouth opening at an edge of the bracket plate;

a support plate adapted to be attached to the rear face of the bracket plate to close the key-way at said rear face;

mounting means for mounting the bracket plate and support plate to one of said tubular members with the key-way facing away from and extending longitudinally of the one tubular member; and an elongated supporting key adapted to be attached to the other of said tubular members lengthwise thereof, the supporting key being positionable through the entry mouth of said key-way and having side walls converging from a front face of the key to a rear face thereof for mating proximity to the diverging side walls of the key-way.

10. The support system of claim 9 wherein the side walls of the key-way and the side walls of the supporting key are generally parallel, and said key-way includes a closed end opposite the entry mouth thereof.

11. The support system of claim 9 wherein said bracket plate includes aperture means for facilitating fastening of the bracket plate to the support plate.

12. The support system of claim 9 wherein said supporting key has aperture means for facilitating fastening of the supporting key to the other of said tubular members.

13. The support system of claim 12 wherein said bracket plate includes aperture means for facilitating fastening of the bracket plate to the support plate.

14. The support system of claim 9 wherein said mounting means comprises at least one U-bolt type member having an arcuate portion joining a pair of leg portions, the arcuate portion being adapted to surround the one tubular member, and the leg portions being adapted for attachment to the bracket plate and attached support plate.

15. A support system for detachably securing an IV stand to a wheelchair, comprising:

an IV stand having a tubular support post;

a wheelchair having a tubular frame portion;

a bracket plate including an elongated key-way having side walls diverging from a front face of the bracket plate to a rear face thereof, the key-way extending entirely through the bracket plate between said faces and including an entry mouth opening at an edge of the bracket plate;

a support plate adapted to be attached to the rear face of the bracket plate to close the key-way at said rear face;

mounting means for mounting the bracket plate and support plate to one of said tubular frame portion and tubular support post, with the key-way facing away from and extending longitudinally of the one tubular frame portion and tubular support post; and an elongated supporting key adapted to be attached to the other of said tubular frame portion and tubular support post, the supporting key being positionable through the entry mouth of said key-way and having side walls converging from a front face of the key to a rear face thereof for mating proximity to the diverging side walls of the key-way.

16. The support system of claim 15 wherein said mounting means comprises at least one U-bolt type member having an arcuate portion joining a pair of leg portions, the arcuate portion being adapted to surround said one of the tubular frame portion and tubular support post, and the leg portions being adapted for attachment to the bracket plate and attached support plate.

17. The support system of claim 15 wherein said support plate and bracket plate comprise a one-piece structure.

18. The support system of claim 17 wherein said one-piece support plate and bracket plate is an integral part of the tubular support post.

19. A support system for detachably securing an attachment to a wheelchair, comprising:

a wheelchair having a tubular frame portion;

a bracket plate including an elongated key-way having side walls diverging from a front face of the bracket plate to a rear face thereof, the key-way extending entirely through the bracket plate between said faces and including an entry mouth opening at an edge of the bracket plate;

a support plate adapted to be attached to the rear face of the bracket plate to close the key-way at said rear face;

mounting means for mounting the bracket plate and support plate to the attachment with the key-way facing away from and extending longitudinally of the attachment; and an elongated supporting key attached to the tubular frame portion of the wheelchair, the supporting key being positionable through the entry mouth of said key-way and having side walls converging from a front face of the key to a rear face thereof for mating proximity to the diverging side walls of the key-way.

* * * * *